US006988107B2

(12) United States Patent
Meek et al.

(10) Patent No.: US 6,988,107 B2
(45) Date of Patent: *Jan. 17, 2006

(54) REDUCING AND CONTROLLING SIZES OF MODEL-BASED RECOGNIZERS

(75) Inventors: Christopher Meek, Kirkland, WA (US); Bo Thiesson, Woodinville, WA (US); John R. Bennett, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 508 days.

This patent is subject to a terminal disclaimer.

(21) Appl. No.: 10/185,172

(22) Filed: Jun. 28, 2002

(65) Prior Publication Data

US 2004/0002940 A1 Jan. 1, 2004

(51) Int. Cl.
*G06F 17/30* (2006.01)
(52) U.S. Cl. .............................. 707/101; 707/1; 707/10; 382/102
(58) Field of Classification Search .................... 707/1, 707/101; 382/102, 159, 160, 186, 187, 188, 382/189, 224, 228, 229, 241; 704/251; 600/407
See application file for complete search history.

(56) References Cited

U.S. PATENT DOCUMENTS

| 5,121,441 | A | * | 6/1992 | Chefalas et al. ............. 382/189 |
| 5,303,312 | A | * | 4/1994 | Comerford et al. ......... 382/189 |
| 5,315,667 | A | * | 5/1994 | Fujisaki et al. .............. 382/187 |
| 5,319,721 | A | * | 6/1994 | Chefalas et al. ............. 382/160 |
| 5,455,872 | A | * | 10/1995 | Bradley ....................... 382/228 |
| 5,544,264 | A | * | 8/1996 | Bellegarda et al. .......... 382/188 |
| 5,550,930 | A |   | 8/1996 | Berman et al. |
| 5,555,317 | A | * | 9/1996 | Anderson .................... 382/159 |
| 5,649,027 | A |   | 7/1997 | Mahajan et al. |
| 5,680,480 | A | * | 10/1997 | Beernink et al. ............ 382/187 |
| 5,710,832 | A |   | 1/1998 | Berman et al. |
| 5,729,629 | A |   | 3/1998 | Dai |
| 5,802,207 | A | * | 9/1998 | Huang ......................... 382/224 |
| 5,812,697 | A | * | 9/1998 | Sakai et al. .................. 382/186 |
| 5,933,531 | A | * | 8/1999 | Lorie ........................... 382/229 |
| 6,035,062 | A | * | 3/2000 | Takasu et al. ............... 382/187 |
| 6,061,472 | A |   | 5/2000 | Hullender et al. |
| 2003/0086612 | A1 | * | 5/2003 | Hullender .................... 382/187 |

OTHER PUBLICATIONS

Nell Dale, "Ada Plu Data Structures" 1996, DC Heth and Company, p. 169.*

Vijayshankar Raman; "Locality Preserving Dictionaries: Theory & Application to Clustering in Databases," Symposium on Principles of Database Systems, 1999, pp. 337-345, ACM New York, NY, USA.

Gholamhosein Sheikholeslami; Aidong Zhang, "Approach to Clustering Large Visual Databases Using Wavelet Transform," Proceedings of the SPIE—The International Society for Optical Engineering, 1997, pp. 322-333, vol. 3017, SPIE-Int. Soc. Opt. Eng., USA.

(Continued)

*Primary Examiner*—Jeffrey Gaffin
*Assistant Examiner*—Hassan Mahmoudi
(74) *Attorney, Agent, or Firm*—Banner & Witcoff

(57) ABSTRACT

A technique for reducing a model database for use with handwriting recognizers. The model database is processed with a tuning set to identify a set of models that would result in the greatest character recognition accuracy. If further model database reduction is desired, the technique iteratively identifies smaller models that have the least adverse effect on the error rate. The technique continues identifying smaller models until a desired model database size has been achieved.

28 Claims, 10 Drawing Sheets

OTHER PUBLICATIONS

Stephen Milliner; Mike Papazoglou; Hans Weigand, "Linguistic Tool Based Information Elicitation in Large Heterogeneous Database Networks," Proceedings of the Second International Workshop, 1996, pp. 234-246, IOS Press, Netherlands.

Toshifumi Yamauchi; Yasuharu Itamoto; Jun Tsukumo, "Shape Based Learning for a Multi-Template Method, and Its Application to Handprinted Numeral Recognition," Proceedings of the Fourth International Confeence on Document Analysis and Recognition, 1997, pp. 495-498, vol. 2, IEEE Comput. Soc., Los Alamitos, CA, USA.

Tun-Wen Pai; Keh-Hwa Shyu; Ling-Fan Chen; Gwo-Chin Tai, "Mathematical Morphology Based Shape Feature Analysis for Chinese Character Recognition Systems," Proceedings of the SPIE—The International Society for Optical Engineering, 1995, pp. 922-930, USA.

I. Egorov; V. Lobachev, "Classification of Databases and Database Management Systems in the USSR," 15th International Online Information Meeting Proceedings, 1991, pp. 219-223, Learned Inf., Oxford, UK.

* cited by examiner

REDUCING AND CONTROLLING SIZES OF MODEL-BASED RECOGNIZERS

RELATED APPLICATION

This disclosure is related to the following co-pending application: "REDUCING AND CONTROLLING SIZES OF PROTOTYPE-BASED RECOGNIZERS" by Henry Rowley, et al., having U.S. patent application Ser. No. 10/184,367, and filed on Jun. 28, 2002.

FIELD OF THE INVENTION

Aspects of the invention are directed generally to handwriting recognizers. More particularly, aspects of the invention relate to techniques for reducing and controlling the sizes of model-based handwriting recognizers.

BACKGROUND OF THE INVENTION

Typical computer systems, especially computer systems using graphical user interface (GUI) systems such as Microsoft WINDOWS, are optimized for accepting user input from one or more discrete input devices such as a keyboard for entering text, and a pointing device such as a mouse with one or more buttons for driving the user interface. The ubiquitous keyboard and mouse interface provides for fast creation and modification of documents, spreadsheets, database fields, drawings, photos and the like. However, there is a significant gap in the flexibility provided by the keyboard and mouse interface as compared with the non-computer (i.e., standard) pen and paper. With the standard pen and paper, a user edits a document, writes notes in a margin, and draws pictures and other shapes and the like. In some instances, a user may prefer to use a pen to mark-up a document rather than review the document on-screen because of the ability to freely make notes outside of the confines of the keyboard and mouse interface.

Some computer systems permit a user to write on a screen using, for example, a stylus. For example, the Microsoft READER application permits one to add electronic ink (also referred to herein as "ink") to a document much the same way that a user would write with a standard pen and paper. Hand-held computing devices, commonly known as Personal Digital Assistants (PDAs), as well as the future release of the Tablet PC also permit the user to write on the screen.

A handwriting recognition system may then be used to analyze the electronic ink to recognize characters, for example, Unicode characters. As the user moves the stylus across the screen, the computing device senses the position of the stylus as the user writes and stores the position data. The computing device analyzes the position data and converts it to recognized characters, such as letters or numbers, in a convenient format, such as Unicode format. There are many handwriting recognition systems in use including, for example, memory-based handwriting recognition systems.

Handwriting recognition systems use algorithms to map handwritten data to characters. For example, handwriting recognition systems may utilize neural networks, Hidden Markov Models, and/or prototypes. In the example, of prototypes, the system internally stores prototypes for each character that can be recognized. A prototype is a "picture" of a handwritten character that is used to map handwriting to a character. Alternatively, a recognition system may use statistical models for each character. Recognition systems use recognition algorithms to measure the distance from handwritten data to one or more prototypes or statistical models. As long as the user writes like a prototype or a statistical model, the handwritten data is successfully recognized. Conversely, the more dissimilar the handwritten data and the prototype or the statistical models are, the more likely it is that the handwritten data will be misrecognized. Misrecognition is typically due to the differences in user handwriting styles and legibility of the handwriting. For example, the handwritten word "dear" may be misrecognized as the word "clear" depending on the way the user writes a "d" and the prototypes or statistical models for the character "d," "c," and "1."

One way to minimize the risk of misrecognition is to have a good model database, which provides the various possible shapes the recognizer should understand for any given character. A good model database, however, may have many statistical components, which requires greater memory. This can be quite problematic, for example, in the case where the recognizer is for an East Asian language, which typically has many complex, multi-stroke characters. A large model database can be particularly undesirable in the context where the recognizer is part of a smaller computing device, such as a handheld Personal Digital Assistant (PDA). Handheld computing devices typically are limited in memory and a large model database may not be commercially acceptable.

One option to overcome the above problems is to reduce the size of the model database. The difficulty arises, however, in being able to reduce the model database without significantly compromising the ability of the handwriting recognizer to accurately recognize characters. It is therefore desirable to adequately reduce the size of a model database with minimal effects on character recognition accuracy.

BRIEF SUMMARY OF THE INVENTION

The invention provides a method and apparatus for reducing and controlling the size of a handwriting recognition system by generating a model database that satisfies the size requirements. In particular, the process identifies a limited set of models to satisfy the database size requirements that has the least adverse effect on recognition accuracy. The particular models to be removed may be determined generally by selecting those models that adversely affect the accuracy of character recognition the least.

In accordance with one embodiment, a process, implemented as computer-executable instructions, for reducing a model database is disclosed. The process runs a tuning set through the handwriting recognizer to identify a list of best match models for each tuning sample in the tuning set. The process generates an alternate list for each tuning sample. The process then generates, for each model, error lists of where errors occurred in the alternate list. Based on the error lists, the process identifies an active model for each character that results in the highest accuracy.

The process then starts comparing the active models with smaller models in the model database to identify the smallest model with the least negative affect on accuracy. The process replaces one of the active models with the identified smaller model. The process iteratively repeats replacing active models with smaller models until the desired database size is achieved.

These and other features and aspects of the invention will be apparent upon consideration of the following detailed description of various embodiments of the invention.

BRIEF DESCRIPTION OF THE DRAWINGS

The foregoing summary of the invention, as well as the following detailed description of embodiments, is better understood when read in conjunction with the accompanying drawings, which are included by way of example, and not by way of limitation with regard to the claimed invention.

DETAILED DESCRIPTION OF THE INVENTION

Figure 1:
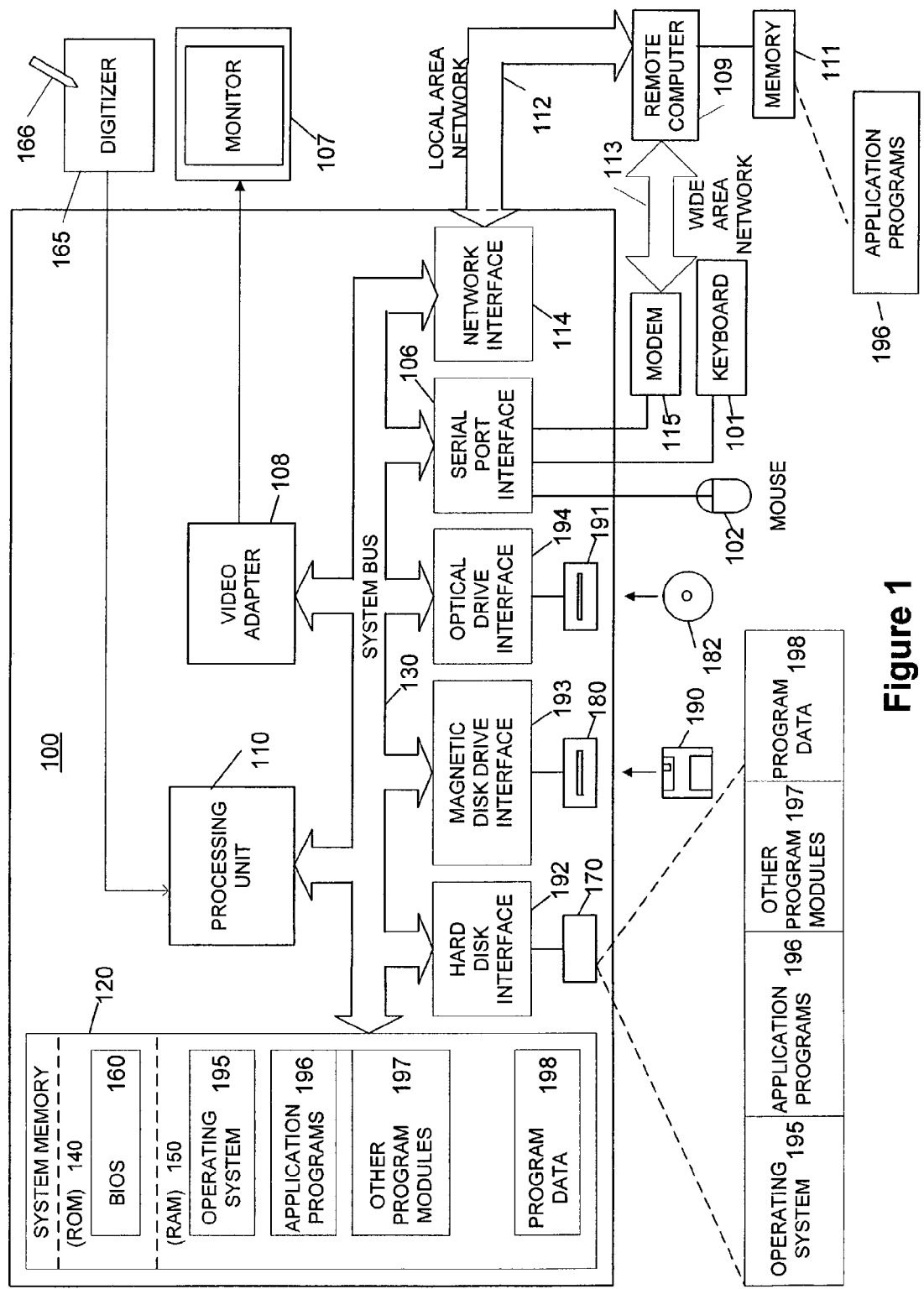
FIG. 1 shows a schematic diagram of a general-purpose digital computing environment that can be used to implement various aspects of the invention.

The exemplary disclosed system and method provides a technique for reducing and controlling the size of a model database, for use with a handwriting recognizer, with minimized effect on error rate. In particular, a database reduction process processes each model to determine its effect on the error rate. The process thereby identifies zero, one or more models for each character that results in the highest character recognition accuracy. The process thereby iteratively reduces the model database by replacing a more accurate model with one that is smaller and that has minimized adverse effect on the error rate. The process iteratively chooses alternate active models from the database that have the least effect on error rate until the desired database size is reached.

Although not required, the invention will be described in the general context of computer-executable instructions, such as program modules. Generally, program modules include variables, routines, classes, objects, scripts, components, data structures, and the like that perform particular tasks or implement particular abstract data types. The invention provides for a software system that may be implemented on any network infrastructure such that networked devices may be remotely controlled by, for example, a general-purpose computer, or a system whereby the networked devices may share information with and about each other. The invention provides and accepts common command, control, and communication through the network while retaining the ability of each device to operate autonomously. In a distributed computing environment, program modules may reside on both local and remote devices.

Terms

Ink or electronic ink as used herein refers to a sequence or a set of strokes with properties. The sequence of strokes may include strokes ordered, for example, by the time captured. Each stroke is comprised of a sequence of points, which may be represented using a variety of known techniques including Cartesian coordinates (X, Y), polar coordinates (r, $\Theta$), and other techniques as known in the art.

A stroke as used herein refers to a sequence or set of captured points. For example, when rendered, the sequence of points may be connected with lines. Alternatively, the stroke may be represented as a point and a sequence of vectors in the direction of the next point. In short, a stroke is intended to encompass any representation of points or segments relating to ink, irrespective of the underlying representation of points and/or what connects the points.

A character is generally a known letter or symbol such as, for example, the letter "a" or the symbol "$". Characters can also be code points, for example, as ASCII elements or UNICODE elements or can be letters or symbols for a particular language. Characters may also generally be shapes, for example, squares, triangles or circles.

A model as used herein is a statistical representation of the features that a given character may have. In other words, it statistically accounts for the various prototypes that a given character may have. In one example, a model comprises one or more components. The components may provide, for example, an average value that each feature for the character will exhibit or a Gaussian distribution describing the values of various features exhibited by the character as well as cross-correlations between these features.

A tuning sample is a character input representing a character that a user would write. Each tuning sample would depict the various ways that a user could write characters.

A tuning set is a set of tuning samples that contain a representative sample of what typical users would write. For example, the tuning set may be those character inputs that a type of users would typically write (e.g., left-handed users). The tuning set may, for example, be a training set and can consist of as many as 20 million tuning samples.

General Purpose Computing Environment

FIG. 1 illustrates a schematic diagram of an exemplary conventional general-purpose digital computing environment that can be used to implement various aspects of the invention. The invention may also be implemented in other versions of computer 100, for example without limitation, a hand-held computing device, a Tablet PC, or may be an application for use with a more general computing device such as a personal computer. The invention may also be implemented in part of a multiprocessor system, a microprocessor-based or programmable consumer electronic device, a network PC, a minicomputer, a mainframe computer, hand-held devices, and the like. Hand-held devices available today include Pocket-PC devices manufactured by Compaq, Hewlett-Packard, Casio, and others.

Referring still to FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), which is stored in the ROM 140, contains the basic routines that help to transfer information between elements within the computer 100, such as during start-up. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 182 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and/or a pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In one embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for communicating over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web server. Any of various conventional web browsers can be used to display and manipulate data on web pages.

Figure 2:
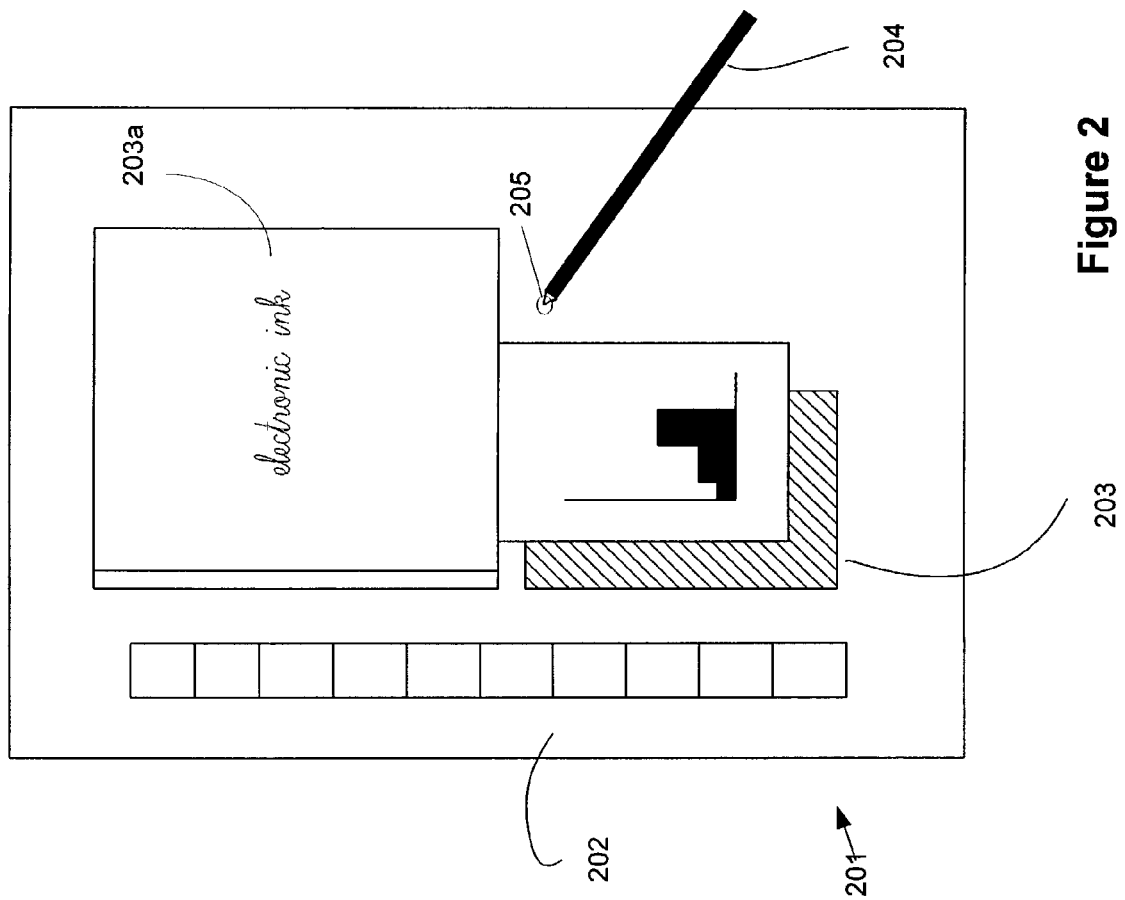
FIG. 2 is a schematic block diagram of an exemplary hand-held device or tablet PC that can be used in accordance with various aspects of the invention.

FIG. 2 illustrates an exemplary hand-held device or Tablet PC 201 that can be used in accordance with various aspects of the invention. Any or all of the features, subsystems, and functions in the system of FIG. 1 can be included in the computer of FIG. 2. Hand-held device or Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Hand-held device or Tablet PC 201 interprets gestures made using stylus 204 in order to manipulate data, enter text, create drawings, and/or execute conventional computer application tasks such as spreadsheets, word processing programs, and the like. For example, a window 203a allows a user to create electronic ink using stylus 204. Window 203a illustrates an example of a line of electronic ink.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 has contacted the display surface 202.

In various embodiments, the system provides an ink platform as a set of COM (component object model) services that an application can use to capture, manipulate, and store ink. One such service enables an application to read and write ink using the disclosed representations of ink. The ink platform may also include a mark-up language including a language like the extensible markup language (XML). Further, the system may use DCOM as another implementation.

Overview of Character Recognition Process

Figure 3:
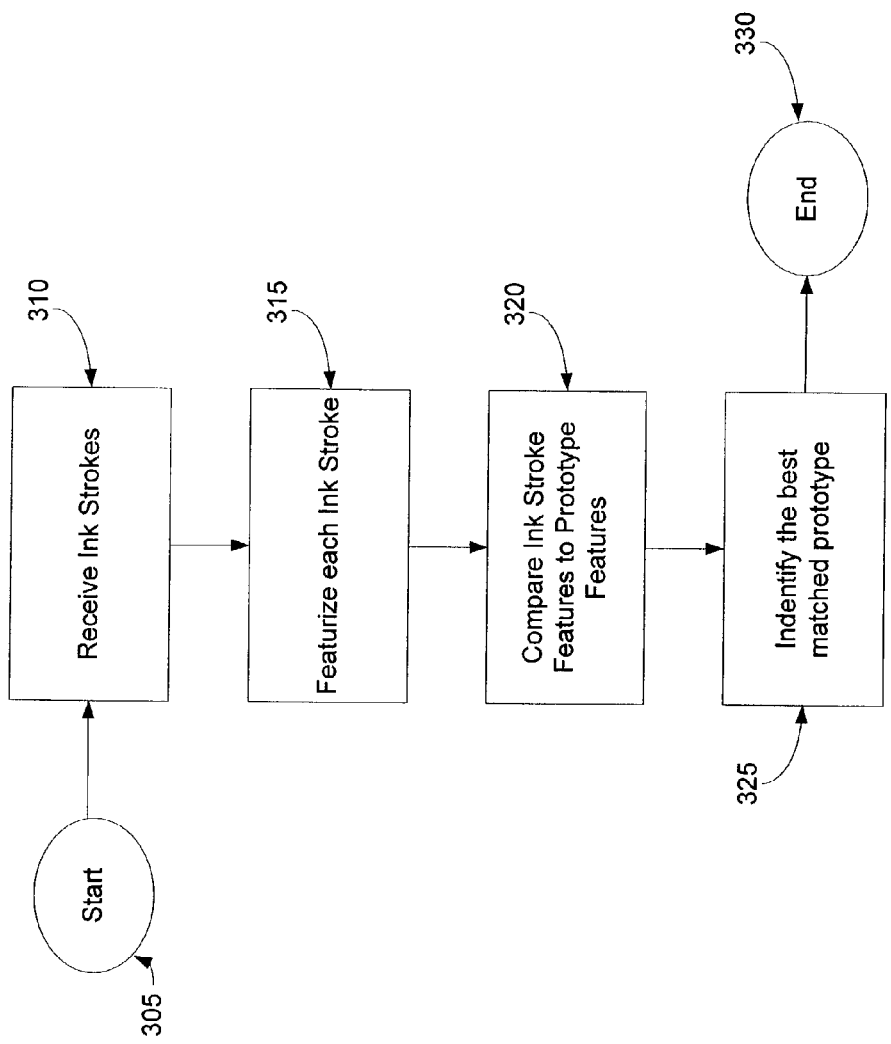
FIG. 3 is a flow chart illustrating the overall character recognition process.

As discussed, handwriting recognizer analyzes the ink strokes and converts them into recognized characters, such as letters or numbers, in a convenient format, such as Unicode format. FIG. 3 illustrates the overall character recognition process. The process starts at step 305 once a user inputs a character comprising one or more ink strokes. At step 310, the computing device senses and stores the position of these ink strokes. At step 315, the computing device processes each ink stroke to extract the features of each ink stroke. Each stroke can therefore be described as a sequence of numbers representing various characteristics of the stroke including, for example, the start point, the end point, the curvature, the overall shape, etc. At step 320, the computing device compares the inputted character with the models in the model database. At step 325, the computing device identifies the model(s) that are the best match(es) based on the closeness of the differences of the various features between the inputted character and the model. The system associates the inputted character with the character corresponding to the best match model.

Figure 4:
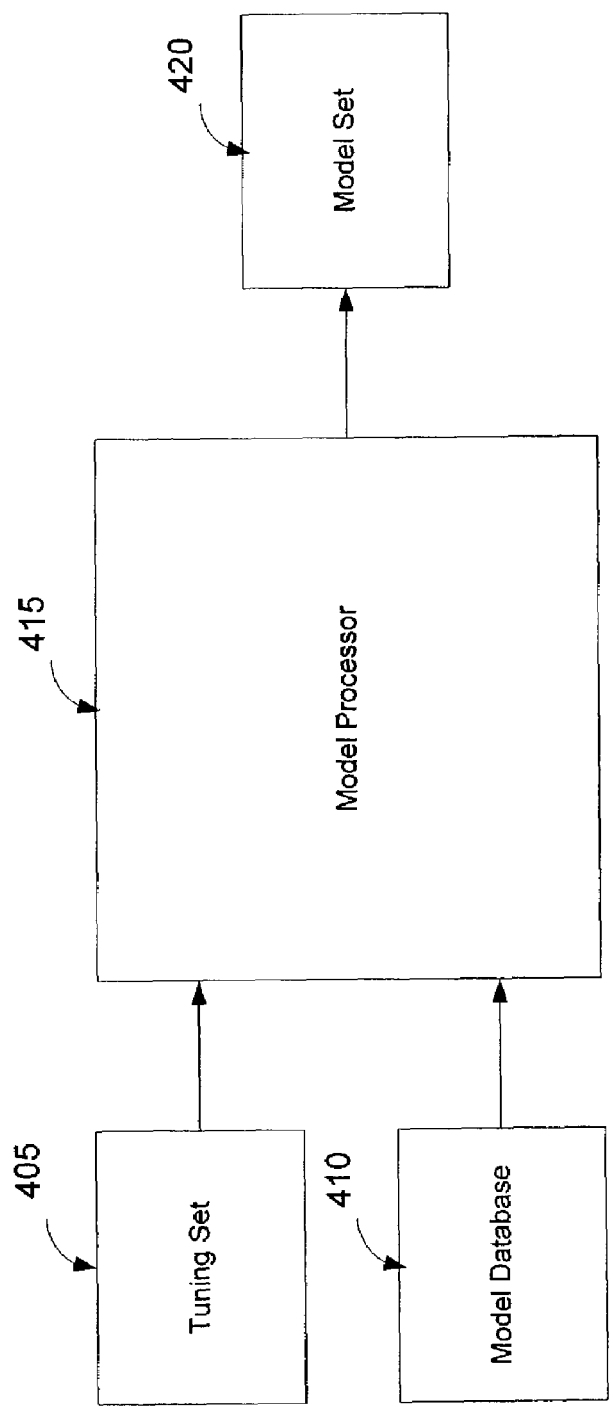
FIG. 4 is a schematic block diagram generally depicting the system for providing a reduced model database in accordance with a preferred embodiment of the present invention.

FIG. 4 is a schematic block diagram of the overall components for providing a reduced model database in accordance with a preferred embodiment of the present invention. The system comprises a tuning set 405 and a model database 410 that is to be reduced in size. As discussed, the tuning set 405 set is a set of character inputs that contain a representative sample of what a typical user would write. A model processor 415 is generally a program module or a set of computer-executable instructions. The model processor 415 receives the model database 410 and, using the tuning set 405, generates a reduced model database 420 using the processing techniques described herein. As discussed, a model is a statistical representation of the features that a given character may have. A model comprises one or more components, wherein each component provides statistical information on a particular style or form of the character (namely, a way of writing the character such as the order of the strokes or shape/angle of the stroke). The various models for a given character in the model database 410 may vary in the number of components and/or the information that is within each component.

Figure 5:
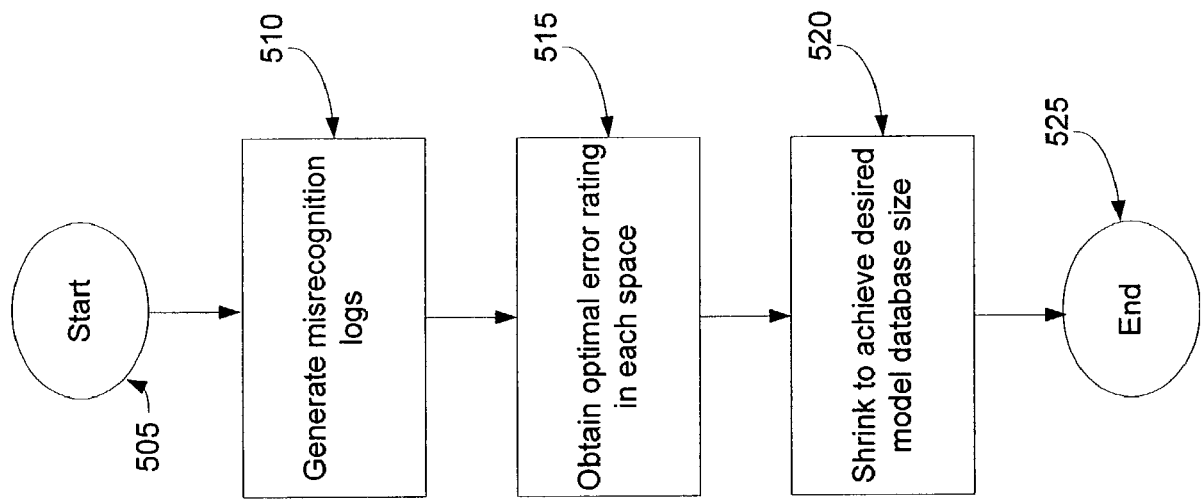
FIG. 5 is a flow chart depicting the overall process for reducing the model database in accordance with a preferred embodiment of the present invention.

FIG. 5 illustrates the overall process for reducing the model database 410 in accordance with the present invention. The process starts at step 505 and at step 510, the process generates error lists. In particular, the process runs a tuning sample through the recognition system to generate an alternate list of models that best matches each tuning sample. Based on this list, the process generates one or more error lists. At step 515, the process, through an iterative process, identifies zero or one model for each character that results in highest overall character recognition accuracy. Alternatively, the process may identify zero, one or more models. It still may be desirable, however, to reduce the model database even further. Accordingly, at step 520, the process starts identifying alternate models that shrink the model database but that reduce accuracy the least. The process continues to iteratively identify alternate models and, at step 525, the process stops once the desired model database size is achieved. Each of these steps is described in further detail herein.

Figure 6:
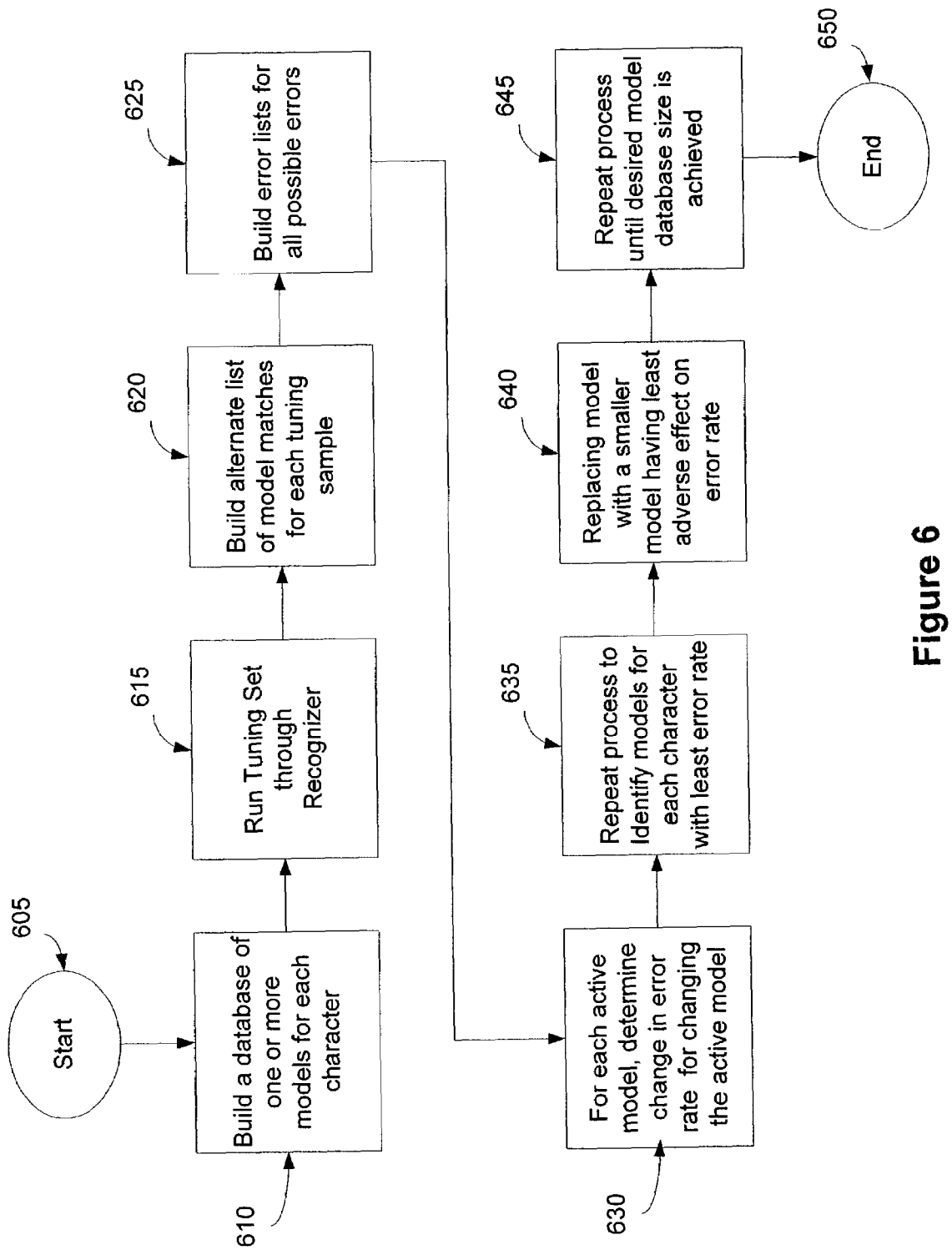
FIG. 6 is a flow chart depicting in more detail the process for reducing the model database in accordance with a preferred embodiment of the present invention.
Figure 7:
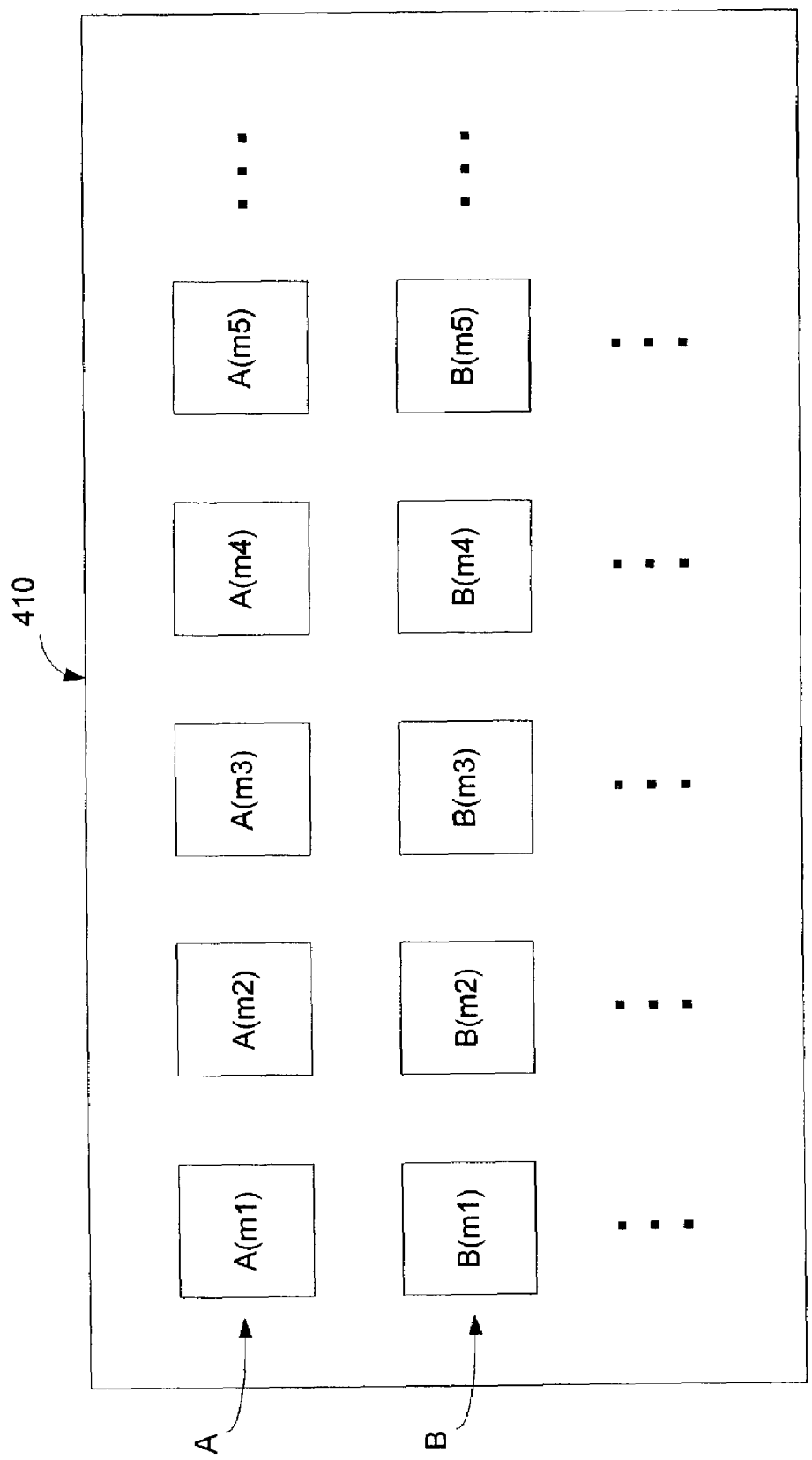
FIG. 7 is a schematic block diagram depicting a model database to be reduced.

FIG. 6 is a flow chart depicting in more detail the process for reducing the model database with minimized effect on the error rate. The process starts at step 605 and at step 610, the process generates a database of various possible models for each character. These models may be generated independent of one another using distinct sets of information and/or the models may be variations of one another. In one preferred embodiment, the models may be Bayesian networks or mixtures of Bayesian networks. See, e.g., Jensen et al., Bayesian Networks and Decision Graphs (Statistics for Engineering and Information Science), Springer Verlag (Jul. 2, 2001); Thiesson, B. et al., "Computationally efficient methods for selecting among mixtures of graphical models, with discussion," Bayesian Statistics 6: Proceedings of the Sixth Valencia International Meeting, pages 631–656. Clarendon Press, Oxford (1999). Those skilled in the art, however, will appreciate that any number of techniques alone or in combination may be utilized to generate the model database 410. FIG. 7 is a schematic depiction of a model database 410, wherein there exist one or more models for any given character. In the illustration of this figure, the model database 410 contains models A(m1), A(m2), etc. corresponding to the character A. Similarly, the figure depicts models B(m1), B(m2), etc. corresponding to the character B. Although not required, zero, one or more models may exist for each character to be recognized.

Figure 8:
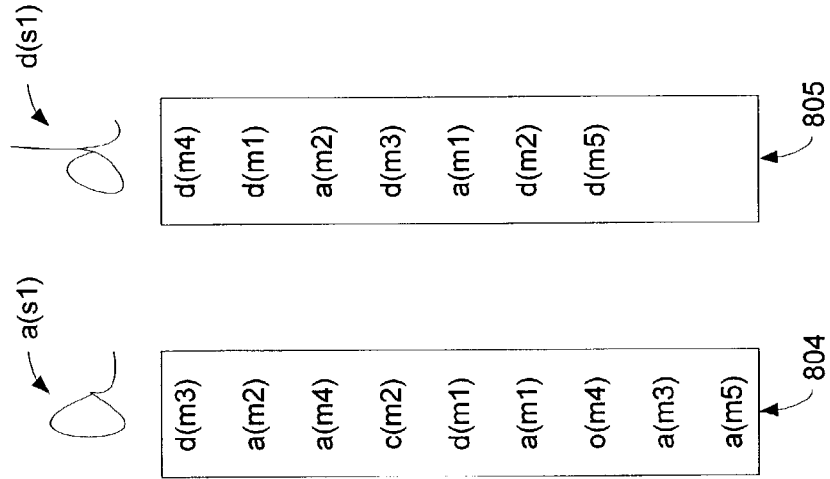
FIG. 8 is a simplified example of alternate tables for tuning samples that rank models according to their match to the associated tuning sample.

Referring back to FIG. 6, at step 615, the process runs the tuning set through a recognizer. For each tuning sample within the tuning set, the process, at step 615, identifies an alternate list of models that best matches the tuning sample in order of closeness. The process may use, for example, a classifier to identify matching models. FIG. 8 illustrates an example of how the process matches models to tuning samples. Shown in this figure are tuning samples a(s1) and d(s1) representing characters "a" and "d" respectively. The process generates an alternate list of best match models for each tuning sample. Accordingly, for tuning sample a(s1), an alternate list 804 is generated showing the possible models that match tuning sample a(s1) in decreasing order of match (a similar alternate list 805 is generated for tuning sample d(s1)). In this example, model d(m3) in the alternate list 804 represents the model that is the best match to tuning sample a(s1). The following models in the alternate list 804, starting with model a(m2), are model matches in decreasing order. The alternate list 804 continues listing models until each model for the given character has been identified. For example, if the model database 410 contains five models for the "a" character, the process will continue listing models in the alternate list 804 in decreasing order of match until all five of these models have been listed.

Each model and sample in FIG. 8 is identified according to a number and the character that it represents. Accordingly, model a(m2) signifies that it is the second model for the character "a". Similarly, tuning sample a(s1) signifies that it is the first sample in the tuning set for the character "a". Thus, tuning sample a(s1) has a best match model d(m3), which is the model that has been determined to the closest or best match with the tuning sample a(s1). Unfortunately, model d(m3) misrecognizes the tuning sample's character. Tuning sample d(s1) is also misrecognized by the best model match a(m1). Those models that in the alternate list are incorrect matches are referred to herein as error-causing matches. Those models in the alternate list that are correct matches are referred to herein as correct matches. It will be appreciated that FIG. 8 is a highly simplified depiction of the process for illustration purposes only. The number of tuning samples in the tuning set 405 may be in the range of millions and the number models in the model database 410 may be in the range of thousands (for example, there may be tens of models per character).

Figure 9:
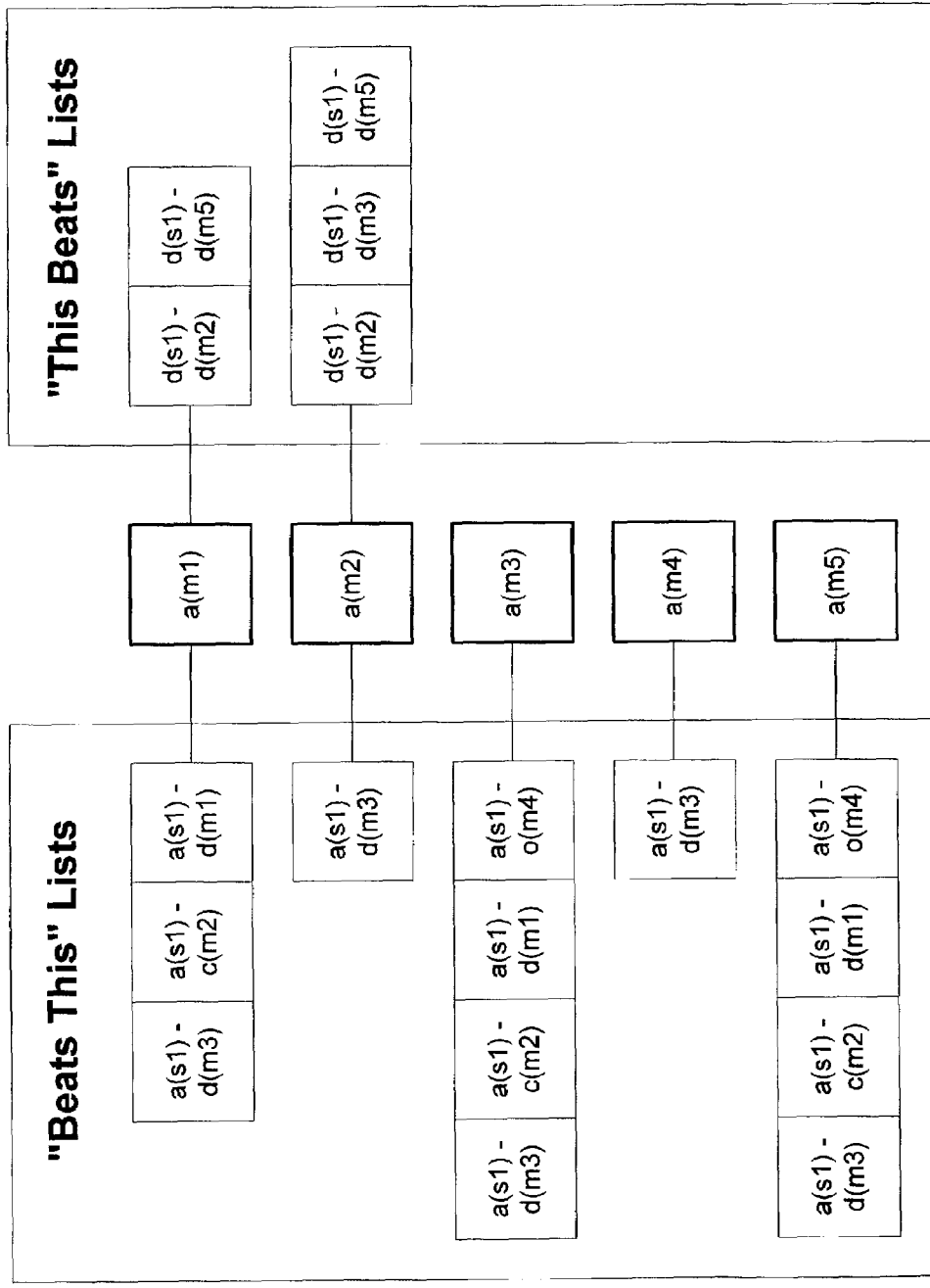
FIG. 9 depicts the error lists for certain models, which were generated from the alternate tables of FIG. 8.

Referring back to FIG. 6, at step 620, the process builds error lists identifying possible misrecognitions based on the alternate list generated in step 615. As illustrated in FIG. 9, the process generates a plurality of "Beats This" lists 905 and a plurality of "This Beats" lists 910. In particular, for each model in the model database, the process will generate an associated Beats This list and an associated This Beats list. The Beats This list for any particular model identifies all error-causing matches that were ranked higher in any of the alternate lists, generated in step 615. For example, for sample a(s1), the alternate list 804 shows several error-causing matches that were ranked higher than the any of the models for that character, namely d(m3), c(m2) d(m1), and o(m4). Looking specifically at a(m1) in the alternate list 804, there are three error-causing matches, namely d(m3), c(m2), and d(m1), that were ranked higher than a(m1). The Beats This list for a(m1) would therefore identify these three models and the associated sample where the misrecognition occurred, namely a(s1). The Beats This list for model a(m1) would continue identifying such higher-ranked, error-causing matches for all other samples for the "a" character in the tuning set. As another example, a(m2) has one error-causing match that is higher in the alternate list 804, namely d(m3).

The This Beats list for any particular model correlates to places in the alternate list where the model was an error-causing match. The This Beats list identifies all correct matches that were lower in the alternate list. For example, for tuning sample d(s1), models a(m1) and a(m2) are error-causing matches. Thus, the This Beats lists for model a(m1) will identify those correct matches where a(m1) was an error-causing match and ranked higher than the correct match. The same would apply for model a(m2). As illustrated in FIG. 9, the This Beats list for model a(m1) identifies d(m2) and d(m5) as being the correct matches that a(m1) is higher than on the alternate list 805. Although described as lists 905 and 910, those skilled in the art will appreciate that the errors list can take any number of forms and formats and still be suitable for use with the present invention.

Figure 10:
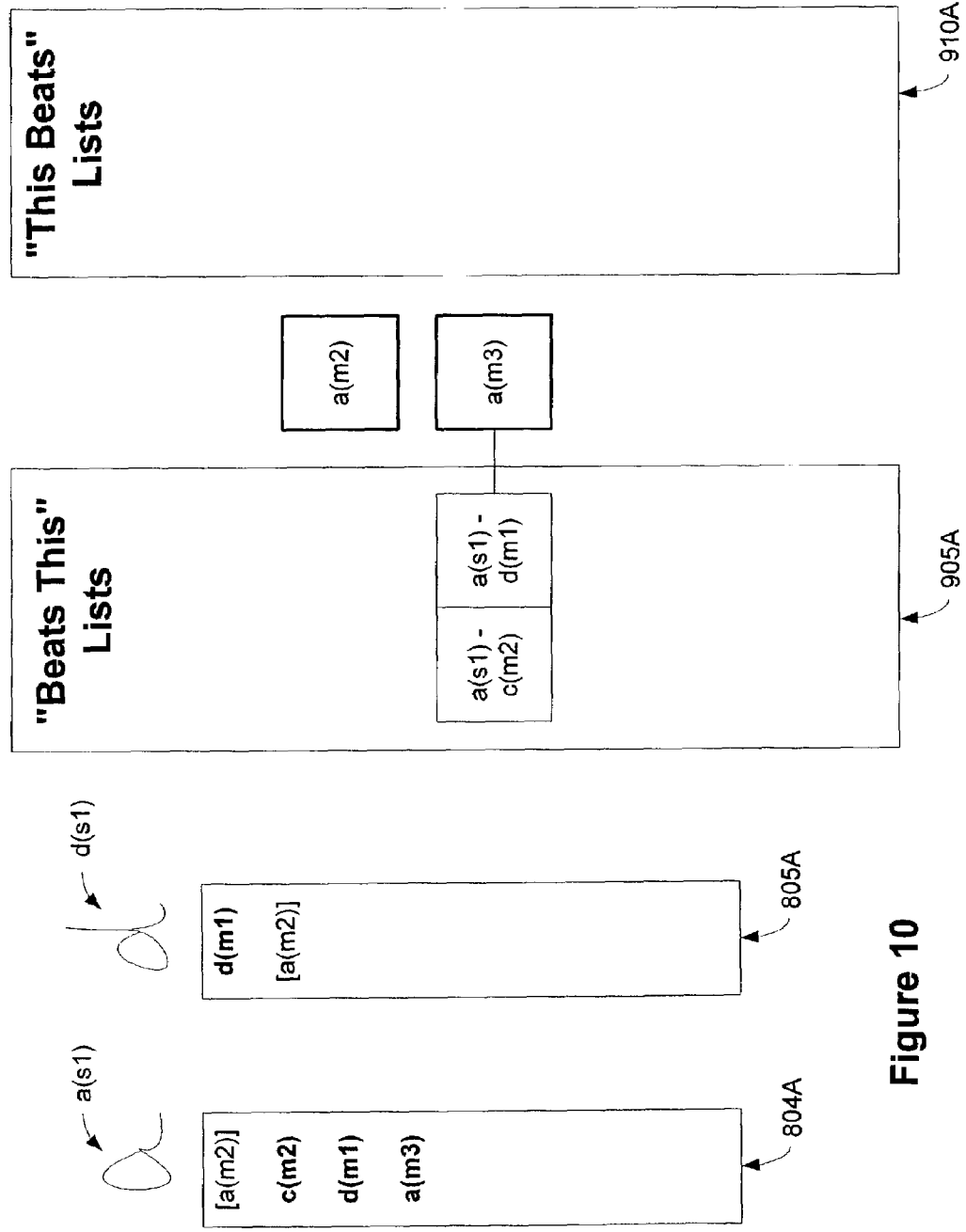
FIG. 10 depicts modified alternate tables and error lists.

Referring back to FIG. 6, at step 630, the process selects for each character an active model. The process may select the active models using any number of techniques including, but not limited to, random selection, selecting the largest models, and/or statistical analysis. Once the initial set of active models have been identified, the process then computes for each active model a change in error for changing the active model. For example, the process may select a(m3) as the active model for the character "a." The process also identifies active models for each of the other characters. For example, using the illustration in FIGS. 8 and 9, the process may identify active models c(m2), d(m1), and o(m3). The process then determines the change in error rate for changing the active model from a(m3) to a(m2). In particular, the process may compute the changes of the two models relative to the Beats This and the This Beats lists (ignoring the other models in the lists that are not active). FIG. 10 illustrates modified alternative lists 804A and 805A as well as modified Beats This lists 905A and This Beats lists 910A in accordance with this example. The lists in FIG. 10 are formed from the lists in FIGS. 8 and 9 by ranking of all of the active models and removing all other non-active models. Accordingly, a change of the active model a(m3) to a(m2) caused an improvement of two in the Beats This list 905A and no change in the This Beats list 910A (considering sample a(s1) only).

The process may quantify the change in error rate using any number of techniques. In one embodiment, for example, the error is computed by determining the number of active models that are closer matches to a given sample relative to the given active model. In other words, the error is the rank of the active model in the best match list (illustrated in FIG. 8). Stated yet another way, for a given sample, the error is determined by the number of sample-active model pairs that are in the "Beats This" list and the "This Beats" list for a given active model (illustrated in FIG. 9). Alternatively, the process may have a weighted change determination. In particular, a value may be assigned to a position on the alternate list 804A and 805A, for example, the first position may be assigned a value of 1, the second position a value of ½, the third position a value of ⅓, etc. Thus, the change of active model from a(m3) to a(m2) causes a change in position in the alternate list 804A from fourth position to the first position, causing an improved accuracy of 1.583(1+½+⅓−¼) for a(s1). The improved accuracy value is determined by adding the point value improvement from going from the fourth position (¼ point) to the first position (1+½+⅓ points). As yet another alternative, the process may call a function that may consider an importance of the change and provide a weighted determination of whether there is an improvement in recognition accuracy for the change.

Once the change in accuracy or error rate has been determined, the process replaces the active model with the proposed model if there was a net reduction in error rate. The process may also compare the active model with having no model for the character (i.e. an empty model). Thus, the active model may be compared to determine whether it is better to have a 100% misrecognition rate for the character associated with the active model in exchange for the active model not being the source of misrecognition for other characters. This may be the case, for example, where the active model is for a rarely-used character, but that causes considerable errors for other more-commonly used characters.

Referring back to FIG. 6, at step 635, the process iteratively repeats step 630 until the process has identified the combination of active models that results in the lowest error rate. Each character may therefore be identified with either zero orone (or more than one) model, the combination of which has a minimal error rate. Alternatively, the process repeats step 630 until the error rate is below a predetermined threshold.

At step 640, the process starts the process of reducing the model database by identifying models that are smaller in required memory but that have a minimized adverse effect on accuracy. In particular, for each character the process compares the active model with every other model for that character and determines the change in error rate. For each comparison, the process determines a proportion of how much memory could be saved versus the increase in error rate for making the change in active model. This can be done, for example, by taking the ratio of change in error rate to the change in size (error/size). The process performs this task for all models in the model database 410.

The process identifies the model that would produce the smallest change in error rate relative to the change in size, namely the model that would have the smallest error/size ratio, and replaces the active model with the identified smaller model. Alternatively, the process may identify more than one model to replace. At step 645, the process repeats step 640 until a desired model database size is achieved. Once the process achieves the desired database size, the process ends at step 650. Although not required, in the typical case, it is anticipated that the resulting reduced model database 420 may have one representative model for each character.

The present invention therefore provides a mechanism to reduce the size of a model database with minimized effects on accuracy. Although described with respect to characters, the present invention is generally a competitive system for statistical models.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the invention. Also, where certain units of properties such as size (e.g., in bytes or bits) are used, any other units are also envisioned.

We claim:

1. A method of reducing a model database for use with a handwriting recognizer comprising the steps of:
   (a) processing a plurality of models to form a model set that has a higher accuracy for character recognition, the model set having a first size, wherein the processing includes: (i) running a tuning set through a recognizer: (ii) forming an alternate list of best match models for each tuning sample within the tuning set; and (iii) generating respective errors lists for models within the model set, wherein each errors list indicates, for the errors list's corresponding model, any error causing matches that are ranked higher in any of the alternate lists than the errors list's corresponding model and wherein each errors list indicates, for the errors list's corresponding model, any occurrences in the alternate lists where the errors list's corresponding model is an error-causing match that is ranked higher than a correct match; and
   (b) replacing at least one model from the model set with another model to form a revised model set, the revised model set having a second size smaller than the first size, wherein at least one of the alternate lists of best match models and the errors lists is used to select the another model so that a recognition accuracy of the revised model set is minimally adversely affected relative to the model set's recognition accuracy.

2. The method of reducing a model database of claim 1, further comprising the step of:
   (c) repeating the step of replacing until the second size of the revised model set reaches a desired size.

3. The method of reducing a model database of claim 1, wherein the step of processing comprises the steps of (i) selecting at least one active model for a character; (ii) determining a change in an error rate if the active model was changed to an alternate model; (iii) if the error rate is reduced, making the alternate model the active model.

4. The method of reducing a model database of claim 3, wherein the step of selecting is performed by random selection.

5. The method of reducing a model database of claim 3, wherein the step of selecting is performed by statistical analysis of the models.

6. The method of reducing a model database of claim 3, wherein the step of selecting is performed by selecting models that are largest in required-memory size.

7. The method of reducing a model database of claim 3, wherein step steps (i)–(iii) of claim 5 are performed for each character to be recognized.

8. The method of reducing a model database of claim 3, wherein the alternate model of step (ii) of claim 5 is an empty model.

9. The method of reducing a model database of claim 3, wherein the alternate model of step (ii) of claim 5 is more than one model.

10. The method of reducing a model database of claim 3, further comprising the step of (iv) repeating steps (ii) and (iii) of claim 5 for each character to be recognized until the error rate has been improved.

11. The method of reducing a model database of claim 3, further comprising the step of (iv) repeating steps (ii) and (iii) of claim 3 for each character to be recognized until the error rate is minimized.

12. A method of optimizing a model database for use with a handwriting recognizer comprising the steps of:
   (a) selecting at least one active model for a character;
   (b) determining a change in an error rate if the active model was changed to an alternate model by: (i) running a tuning set through a recognizer (ii) forming an alternate list of best match models for each tuning sample within the tuning set; and (iii) generating respective errors lists for models within the model set, wherein each errors list indicates, for the errors list's corresponding model, any error causing matches that are ranked higher in any of the alternate lists than the errors list's corresponding model and wherein each errors list indicates, for the errors list's corresponding model, any occurrences in the alternate lists where the errors list's corresponding model is an error-causing match that is ranked higher than a correct match;
   (c) making the alternate model the active model if the error rate is reduced, wherein at least one of the alternate lists of best match models and the errors lists is used to determine whether the error rate is reduced; and
   (d) repeating the steps of determining and making for each character to be recognized until an error rate is minimized.

13. The method of optimizing a model database of claim 12, wherein the step of repeating is performed until an error rate reaches an absolute minimum.

14. The method of optimizing a model database of claim 12, wherein the step of repeating is performed until an error rate is below a predetermined threshold.

15. The method of optimizing a model database of claim 12, wherein the step of selecting includes the step of selecting an empty model for the character.

16. A method of reducing a model database for use with a handwriting recognizer comprising the steps of:
   (a) selecting at least one active model for a character;
   (b) determining a change in an error rate if the active model was changed to an alternate model by; (i) running a tuning set through a recognizer; (ii) forming an alternate list of best match models for each tuning sample within the tunings set; and (iii) generating respective errors lists for models within a model set, wherein each errors list indicates, for the errors list's corresponding model, any error causing matches that are ranked higher in any of the alternate lists than the errors list's corresponding model and wherein each errors list indicates, for the errors list's corresponding model, any occurrences in the alternate lists where the errors list's corresponding model is an error-causing match that is ranked higher than a correct match;

(a) making the alternate model the active model if the error rate is reduced;

(d) repeating the steps of determining and making for each character to be recognized until an error rate is minimized, thereby forming a model set having a first size;

(e) replacing at least one model from the model set with another model to form a revised model set, the revised model set having a second size smaller than the first size, wherein at least one of the alternate lists of best matches and the errors lists is used to select the another model so that a recognition accuracy of the revised model set is minimally adversely affected relative to the model set's recognition accuracy; and (f) repeating the step of replacing until the second size of the revised model set reaches a desired size.

17. The method of reducing a model database of claim 16, wherein the step of selecting includes the step of selecting an empty model for the character.

18. A computer-readable medium having computer-executable instructions for performing the steps recited in claim 16.

19. A computer-readable medium having a model database for use with a handwriting recognizer, wherein the model database was generated by the process recited in claim 16.

20. A system for reducing a model database comprising in combination:

(a) a tuning set;
(b) a model database; and
(c) a model processor having computer-executable instructions for performing the steps of:
(i) processing a plurality of models to form a model set that has a higher accuracy for character recognition, the model set having a first size, wherein the processing includes:
(i) running a tuning set through a recognizer; (ii) forming an alternate list of best match models for each tuning sample within the tuning set; and (iii) generating respective errors lists for models within the model set, wherein each errors list indicates, for the errors list's corresponding model, any error causing matches that are ranked higher in any of the alternate lists than the errors list's corresponding model and wherein each errors list indicates, for the errors list's corresponding model, any occurrences in the alternate lists where the errors list's corresponding model is an error-causing match that is ranked higher than a correct match; and (ii) replacing at least one model from the model set with another model to form a revised model set, the revised model set having a second size smaller than the first size, wherein at least one of the alternate lists of best match models and the errors lists is used to select the another model so that a recognition accuracy of the revised model set is minimally adversely affected relative to the mode set's recognition accuracy.

21. The system for reducing a model database of claim 20, wherein the model database comprises a plurality of models, wherein each character has at least one associated model.

22. The system for reducing a model database of claim 21, wherein the character comprises at least one letter.

23. The system for reducing a model database of claim 20, wherein the character comprises at least one symbol.

24. The system for reducing a model database of claim 20, wherein the character comprises at least one shape.

25. A computer-readable medium having computer-executable instructions for performing the steps recited in claim 1.

26. A computer-readable medium having a model database for use with a handwriting recognizer, wherein the model database was generated by the process recited in claim 1.

27. A computer-readable medium having computer-executable instructions for performing the steps recited in claim 12.

28. A computer-readable medium having a model database for use with a handwriting recognizer, wherein the model database was generated by the process recited in claim 12.

* * * * *

UNITED STATES PATENT AND TRADEMARK OFFICE
CERTIFICATE OF CORRECTION

| | |
|---|---|
| PATENT NO. | : 6,988,107 B2 |
| APPLICATION NO. | : 10/185172 |
| DATED | : January 17, 2006 |
| INVENTOR(S) | : Christopher Meek et al. |

It is certified that error appears in the above-identified patent and that said Letters Patent is hereby corrected as shown below:

On page 2, item (56), under "Other Publications" in column 1, line 9, delete "Confeence" and insert -- Conference --, therefor.

In column 10, line 47, delete "orone" and insert -- or one --, therefor.

In column 11, line 40, in Claim 1, after "includes" delete ";" and insert -- : --, therefor.

In column 11, line 40, in Claim 1, after "recognizer" delete ":" and insert -- ; --, therefor.

In column 12, line 13, in Claim 7, after "wherein" delete "step".

In column 12, line 13, in Claim 7, delete "claim 5" and insert -- claim 3 --, therefor.

In column 12, line 16, in Claim 8, delete "claim 5" and insert -- claim 3 --, therefor.

In column 12, line 19, in Claim 9, delete "claim 5" and insert -- claim 3 --, therefor.

In column 12, line 23, in Claim 10, delete "claim 5" and insert -- claim 3 --, therefor.

In column 12, line 34, in Claim 12, after "recognizer" insert -- ; --.

In column 12, line 66, in Claim 16, after "model by" delete ";" and insert -- : --, therefor.

In column 13, line 2, in Claim 16, delete "tunings" and insert -- tuning --, therefor.

UNITED STATES PATENT AND TRADEMARK OFFICE
CERTIFICATE OF CORRECTION

PATENT NO. : 6,988,107 B2
APPLICATION NO. : 10/185172
DATED : January 17, 2006
INVENTOR(S) : Christopher Meek et al.

It is certified that error appears in the above-identified patent and that said Letters Patent is hereby corrected as shown below:

In column 13, line 12, in Claim 16, before "making the" delete "(a)" and insert -- (c) --, therefor.

Signed and Sealed this

Twenty-second Day of September, 2009

David J. Kappos
*Director of the United States Patent and Trademark Office*